(12) United States Patent
Tien

(10) Patent No.: US 7,940,693 B2
(45) Date of Patent: May 10, 2011

(54) WIRELESS COMMUNICATION SYSTEM FOR CALCULATING TIME OF FLIGHT

(75) Inventor: Kai-Wen Tien, Tainan (TW)

(73) Assignee: Quanta Computer Inc. (TW)

( * ) Notice: Subject to any disclaimer, the term of this patent is extended or adjusted under 35 U.S.C. 154(b) by 916 days.

(21) Appl. No.: 11/896,758

(22) Filed: Sep. 5, 2007

(65) Prior Publication Data

US 2008/0175165 A1      Jul. 24, 2008

(30) Foreign Application Priority Data

Jan. 24, 2007   (TW) .............................. 96102610 A

(51) Int. Cl.
*G01R 31/08* (2006.01)

(52) U.S. Cl. ........ 370/253; 370/277; 370/278; 370/282; 370/294; 370/473

(58) Field of Classification Search .................. None
See application file for complete search history.

(56) References Cited

U.S. PATENT DOCUMENTS

| | | | |
|---|---|---|---|
| 7,023,816 B2 * | 4/2006 | Couillard ...................... | 370/324 |
| 7,742,916 B2 * | 6/2010 | Barriac et al. ................ | 704/217 |
| 2002/0150048 A1 * | 10/2002 | Ha et al. ........................ | 370/231 |

* cited by examiner

*Primary Examiner* — Huy D Vu
*Assistant Examiner* — Kibrom T Hailu
(74) *Attorney, Agent, or Firm* — Thomas, Kayden, Horstemeyer & Risley, LLP.

(57) ABSTRACT

The invention discloses a wireless communication system for calculating time of flight. The system transmits and receives a plurality of packets every a plurality of delay times. Thereafter, the wireless communication system calculates a plurality of reference times according to the delay times and processing times and then averages the reference times to obtain the time of flight. Thereby, the time of flight can be calculated more accurately.

10 Claims, 4 Drawing Sheets

WIRELESS COMMUNICATION SYSTEM FOR CALCULATING TIME OF FLIGHT

BACKGROUND OF THE INVENTION

1. Field of the Invention

The invention relates to a wireless communication system, and more particularly relates to a wireless communication system for calculating time of flight (TOF).

2. Description of the Prior Art

Recently, the development of the wireless communication positioning has been growing rapidly, and the wireless communication positioning has been widely applied to many applications. For example, the positioning can be applied to the navigation system, the information management of where users locate, the mobile emergency positioning (e.g. related positioning rules of E-911 legislation for phones in America), the logistics management, and the car dispatch.

Time of arrival (TOA) and time difference of arrival (TDOA) are wireless positioning algorithms relative to time, and they can be applied to different kinds of wireless communication positioning, such as the global positioning system (GPS), the cell phone positioning, the ultra wide band (UWB), the ultrasonic positioning, and the like.

Time of flight plays a key role of TOA and TDOA and has a great effect on the accuracy of the positioning. A general method for calculating time of flight does not takes account of the influence of the hardware structure, the interference in the wireless communication environment, and the load of the hardware system, such that the calculated result will not be accurate.

Therefore, a scope of the invention is to provide a wireless communication system for accurately calculating time of flight to solve the aforesaid problems.

SUMMARY OF THE INVENTION

A scope of the invention is to provide a wireless communication system for calculating time of flight.

According to a preferred embodiment, the wireless communication system of the invention comprises a first communication module and a second communication module. The first communication module spends a first processing time transmitting and receiving each packet. And, the second communication module spends a second processing time transmitting and receiving each packet.

In this embodiment, the first communication module transmits a first pilot to the second communication module. After transmitting the first pilot, the first communication module sequentially transmits N first packets each with a first delay time, wherein N is a natural number larger than 1.

After receiving the first pilot, the second communication module sequentially receives the N first packets each with a second delay time. Afterward, the second communication module transmits the second pilot to the first communication module. After transmitting the second pilot, the second communication module sequentially transmits N second packets each with a third delay time. Each of N first packets is respectively corresponds to one of the N second packets.

After receiving the second pilot, the first communication module sequentially receives the N second packets each with a fourth delay time. Afterward, according to N first processing times, N second processing times, N first delay times, N second delay times, N third delay times, and N fourth delay times corresponding to the N first packets and the N second packets, the first communication module calculates N reference times and averages the N reference times to obtain a time of flight (TOF).

Therefore, the wireless communication system of the invention sequentially receives and transmits multiple packets every multiple delay times. According to the delay times and the processing times, the wireless communication system of the invention calculates multiple reference times and then averages the reference times to obtain the TOF. Accordingly, it can be more accurately to calculate the TOF.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
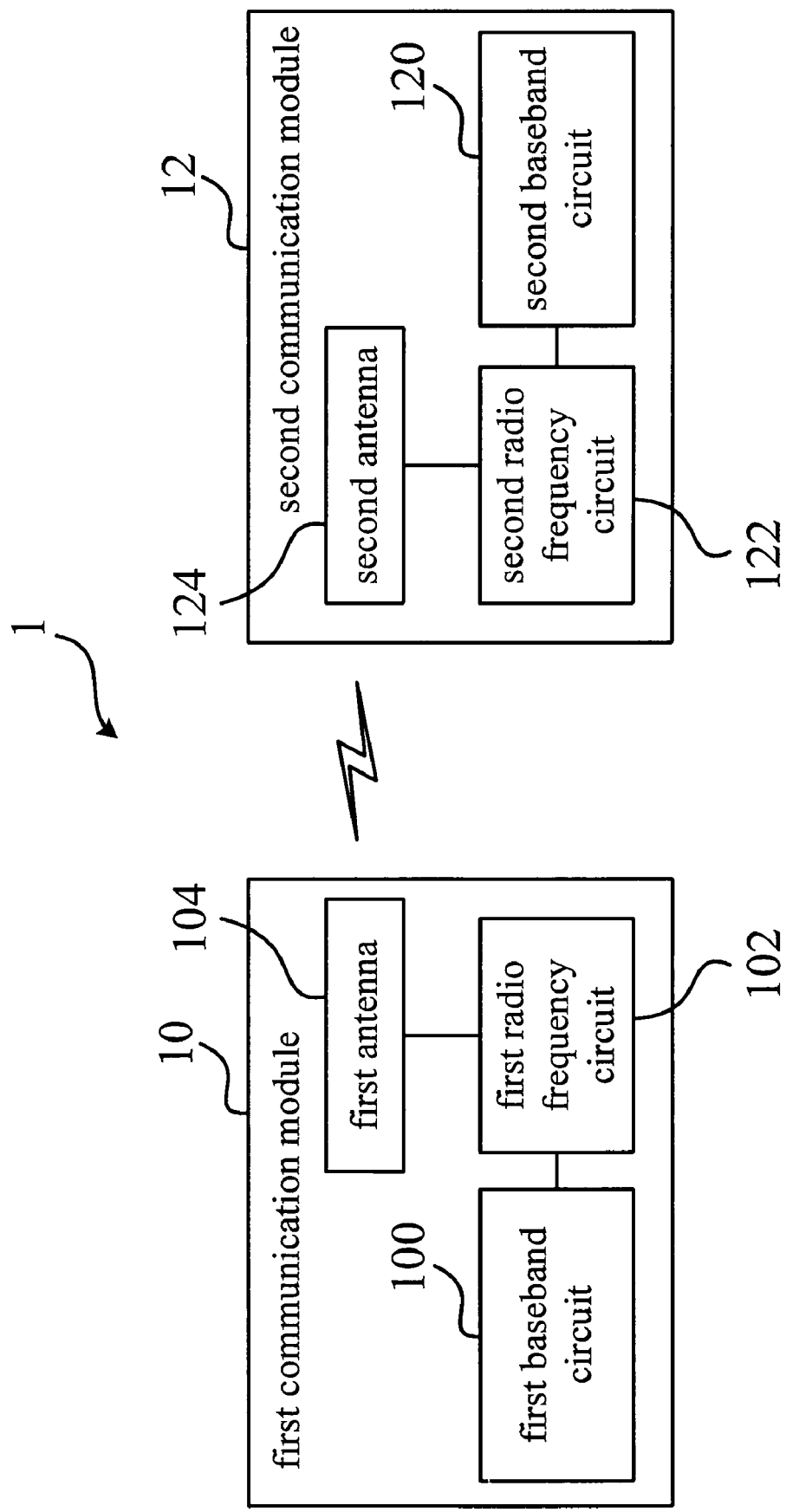
FIG. 1 is a functional block diagram illustrating the wireless communication system according to a preferred embodiment of the invention.

Please refer to FIG. 1. FIG. 1 is a functional block diagram illustrating the wireless communication system 1 according to a preferred embodiment of the invention. As shown in FIG. 1, the wireless communication system 1 comprises a first communication module 10 and a second communication module 12. The first communication module 10 comprises a first baseband circuit 100, a first radio frequency circuit 102, and a first antenna 104. The second communication module 12 comprises a second baseband circuit 120, a second radio frequency circuit 122, and a second antenna 124. In this embodiment, the time of the first communication module 10 is asynchronous with the time of the second communication module 12.

The first communication module 10 spends a first processing time transmitting and receiving each packet. The first processing time comprises a first transmitting time, a first receiving time, and a first influence time, wherein the first communication module 10 spends the first transmitting time transmitting each packet; the first communication module 10 spends the first receiving time receiving each packet; and the first communication module 10 spends the first influence time on wireless environment and system load. The second communication module 12 spends a second processing time transmitting and receiving each packet. The second processing time comprises a second transmitting time, a second receiving time, and a second influence time, wherein the second communication module 12 spends the second transmitting time transmitting each packet; the second communication module 12 spends the second receiving time receiving each packet; and the second communication module 12 spends the second influence time on the wireless environment and the system load. The first processing time and the second processing time are described in the following equation 1 and equation 2:

$$A(\text{Process}) = TxA(\text{Process}) + RxA(\text{Process}) + \Phi xA; \text{ and} \quad \text{Equation 1:}$$

$$B(\text{Process}) = TxB(\text{Process}) + RxB(\text{Process}) + \Phi xB. \quad \text{Equation 2:}$$

In the equation 1 and equation 2, A(Process) represents the first processing time, TxA(Process) represents the first transmitting time, RxA(Process) represents the first receiving time, ΦxA represents the first influence time, B(Process) represents the second processing time, TxB(Process) represents the second transmitting time, RxB(Process) represents the second receiving time, and ΦxB represents the second influence time.

Figure 2A:
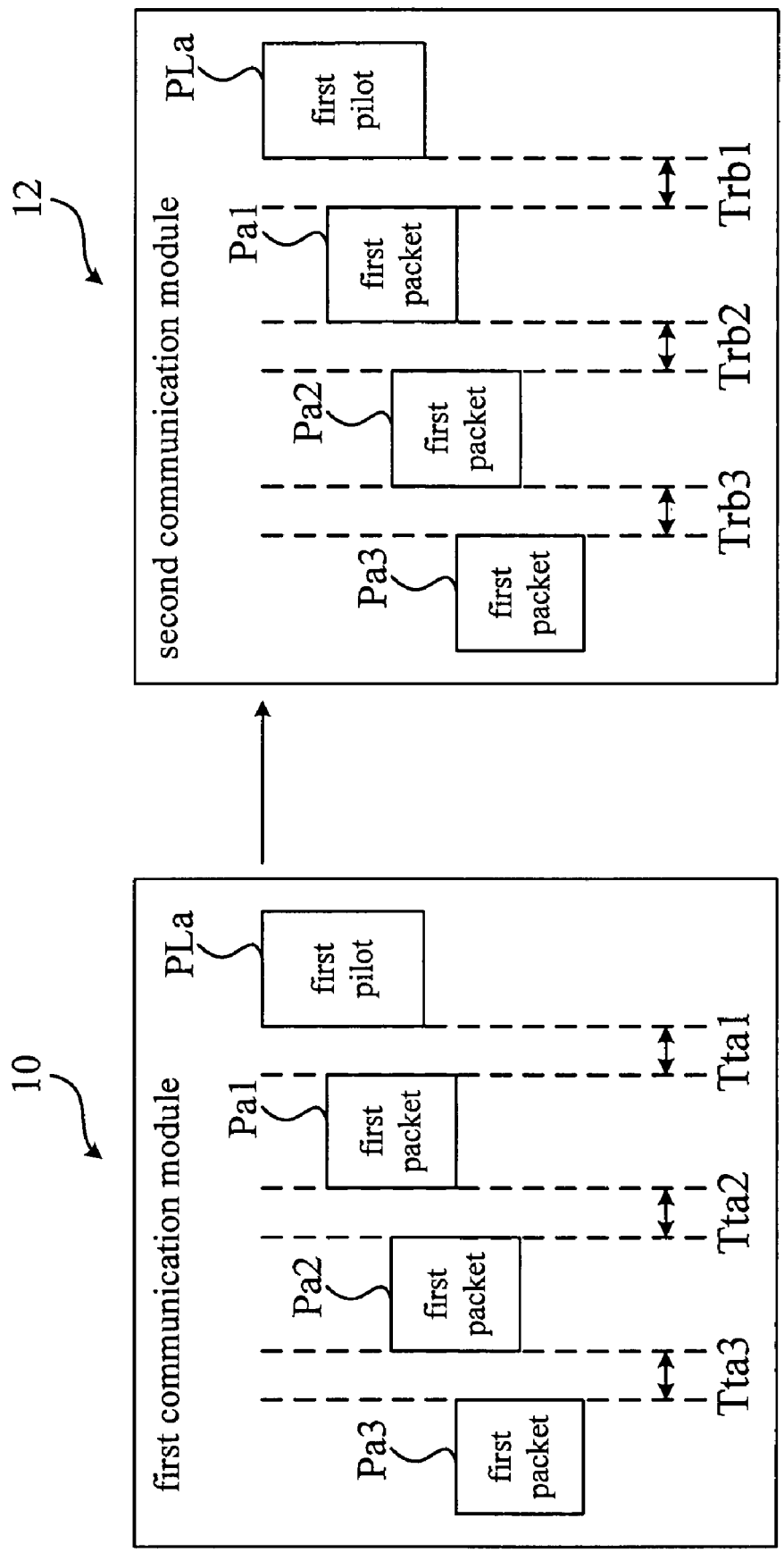
FIG. 2A and FIG. 2B are schematic diagrams illustrating the packet transmission of the wireless communication system in FIG. 1.
Figure 2B:
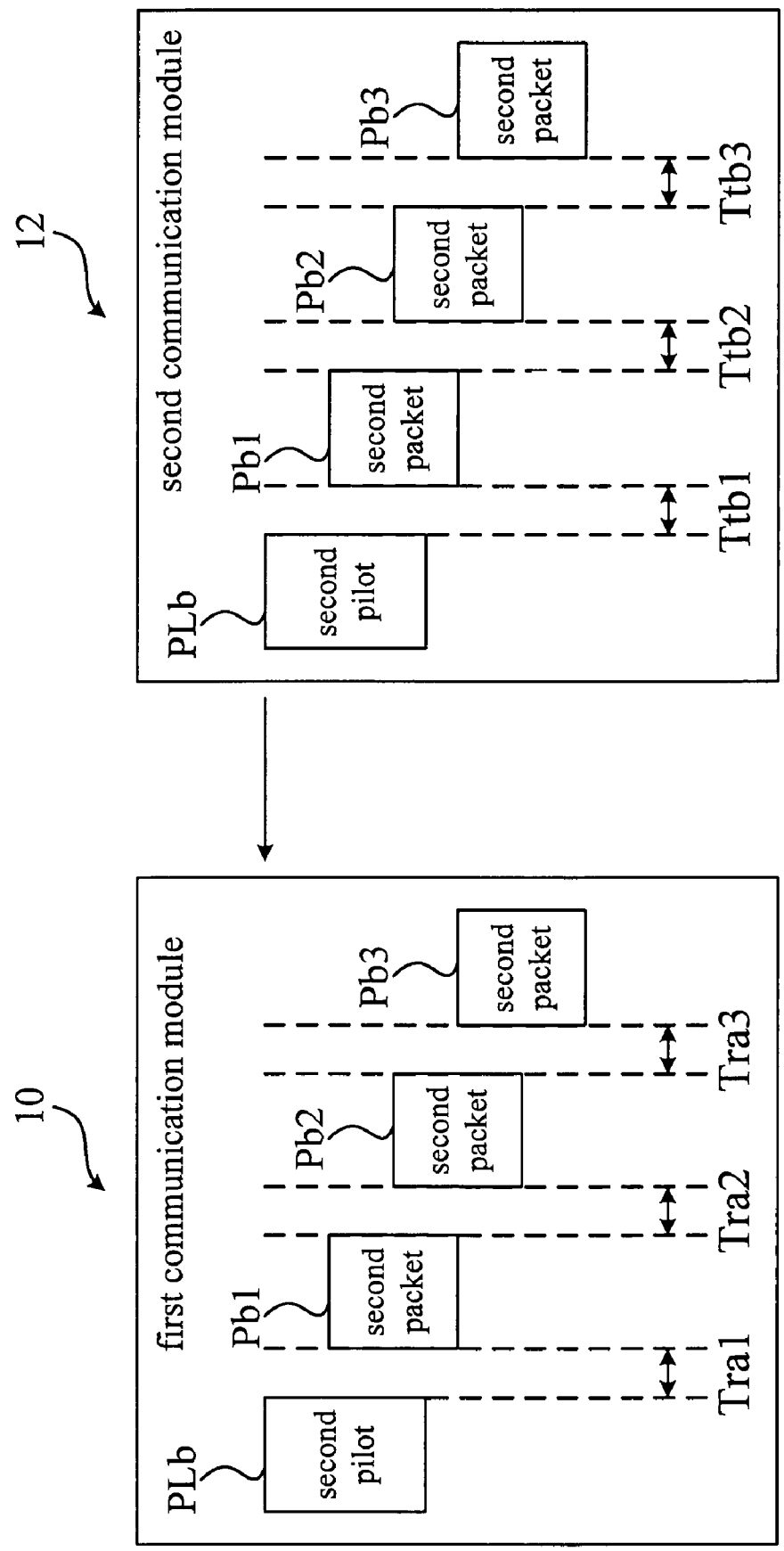

Please refer to FIG. 2A and FIG. 2B. FIG. 2A and FIG. 2B are schematic diagrams illustrating the packet transmission of the wireless communication system 1 in FIG. 1. In this embodiment, as shown in FIG. 2A, the first communication module 10 transmits the first pilot PLa to the second communication module 12. After transmitting the first pilot PLa, the first communication module 10 sequentially transmits three first packets Pa1-Pa3 each with a first delay time Tta1-Tta3. After receiving the first pilot PLa, the second communication module 12 sequentially receives the first packets Pa1-Pa3 each with a second delay time Trb1-Trb3. Afterward, as shown in FIG. 2B, the second communication module 12 transmits the second pilot PLb to the first communication module 10. After transmitting the second pilot PLb, the second communication module 12, sequentially transmits three second packets Pb1-Pb3 each with a second delay time Ttb1-Ttb3. After receiving the second pilot PLb, the first communication module 10 sequentially receives the second packets Pb1-Pb3 each with a fourth delay time Tra1-Tra3. It should be noticed that each first packet Pa1-Pa3 respectively corresponds to one of the second packets Pb1-Pb3.

According to the first processing times A(Process), the second processing times B(Process), the first delay times Tta1-Tta3, the second delay times Trb1-Trb3, the third delay times Ttb1-Ttb3, and the fourth delay times Tra1-Tra3 corresponding to the first packets Pa1-Pa3 and the second packets Pb1-Pb3, the first communication module 10 calculates three reference times and then averages the three reference times to obtain a time of flight (TOF). It should be noticed that the number of the first and second packets can be adjusted according to practical applications.

The reference time can be calculated by the following equation 3:

$$\begin{cases} TxA\_1 + 2\Delta T\_1 + A(Process)\_1 + B(Process)\_1 = RxA\_1 \\ TxA\_2 + 2\Delta T\_2 + A(Process)\_2 + B(Process)\_2 = RxA\_2 \\ TxA\_3 + 2\Delta T\_3 + A(Process)\_3 + B(Process)\_3 = RxA\_3 \end{cases} \quad \text{Equation 3}$$

In the equation 3, TxA_1-TxA_3 respectively represents the first time point when the first communication module 10 transmits the first packet Pa1-Pa3, RxA_1-RxA_3 respectively represents the second time point when the first communication 10 receives the second packet Pb1-Pb3, and ΔT_1-ΔT_3 represents the reference time.

In this embodiment, the relation of the first delay time, the second delay time, and the second influence time is listed in the following equation 4:

$$Trb-Tta = RxB(Process) - TxA(Process) + \Phi xB. \quad \text{Equation 4:}$$

In the equation 4, Tta represents the first delay time, and Trb represents the second delay time.

Similarly, the relation of the third delay time, the fourth delay time, and the first influence time is listed in the following equation 5:

$$Tra-Ttb = RxA(Process) - TxB(Process) + \Phi xA. \quad \text{Equation 5:}$$

In the equation 5, Ttb represents the third delay time, and Tra represents the fourth delay time.

In this embodiment, assuming that the first delay time Tta is equal to the third delay time Ttb, the equation 6 could be obtained by subtracting the equation 5 from the equation 4 first and substituting with the equation 1 and the equation 2 later, listed as follows:

$$Trb-Tra = B(Process) - A(Process). \quad \text{Equation 6:}$$

The equation 6 is substituted into the equation 3, so as to obtain the following equation 7:

$$\begin{cases} TxA\_1 + 2\Delta T\_1 + 2B(Process)\_1 + Tra\_1 - Trb\_1 = RxA\_1 \\ TxA\_2 + 2\Delta T\_2 + 2B(Process)\_2 + Tra\_2 - Trb\_2 = RxA\_2 \\ TxA\_3 + 2\Delta T\_3 + 2B(Process)\_3 + Tra\_3 - Trb\_3 = RxA\_3 \end{cases} \quad \text{Equation 7}$$

In this embodiment, the second processing time B(Process) is estimated by a time difference between a time point after the second communication module 12 receives the first packet Pa1-Pa3 and a time point before the second communication module 12 transmits the corresponding second packet Pb1-Pb3. In such a way, the equation 7 is further transformed into the following equation 8:

$$\begin{cases} TxA\_1 + 2\Delta T\_1 + 2\beta\_1 + Tra\_1 - Trb\_1 = RxA\_1 \\ TxA\_2 + 2\Delta T\_2 + 2\beta\_2 + Tra\_2 - Trb\_2 = RxA\_2 \\ TxA\_3 + 2\Delta T\_3 + 2\beta\_3 + Tra\_3 - Trb\_3 = RxA\_3 \end{cases} \quad \text{Equation 8}$$

In the equation 8, $\beta\_1-\beta\_3$ represents the estimated time difference.

Afterward, substituting the first time point TxA_1-TxA_3 generated while the first communication module 10 transmits the first packet Pa1-Pa3, the second time point RxA_1-RxA_3 generated while the first communication module 10 receives the second packets Pb1-Pb3, the second delay time Trb_1-Trb_3, the fourth delay time Tra_1-Tra_3, and the estimated time difference $\beta\_1-\beta\_3$ into the equation 8, such that the reference time ΔT_1-ΔT_3 is obtained. Further, average the reference times ΔT_1-ΔT_3 to obtain the time of flight.

Because the invention takes account of the influence of the hardware structure, the disturbance in the wireless environment, and the load of the hardware system, the calculated time of flight will be more accurate than the prior art.

Figure 3:
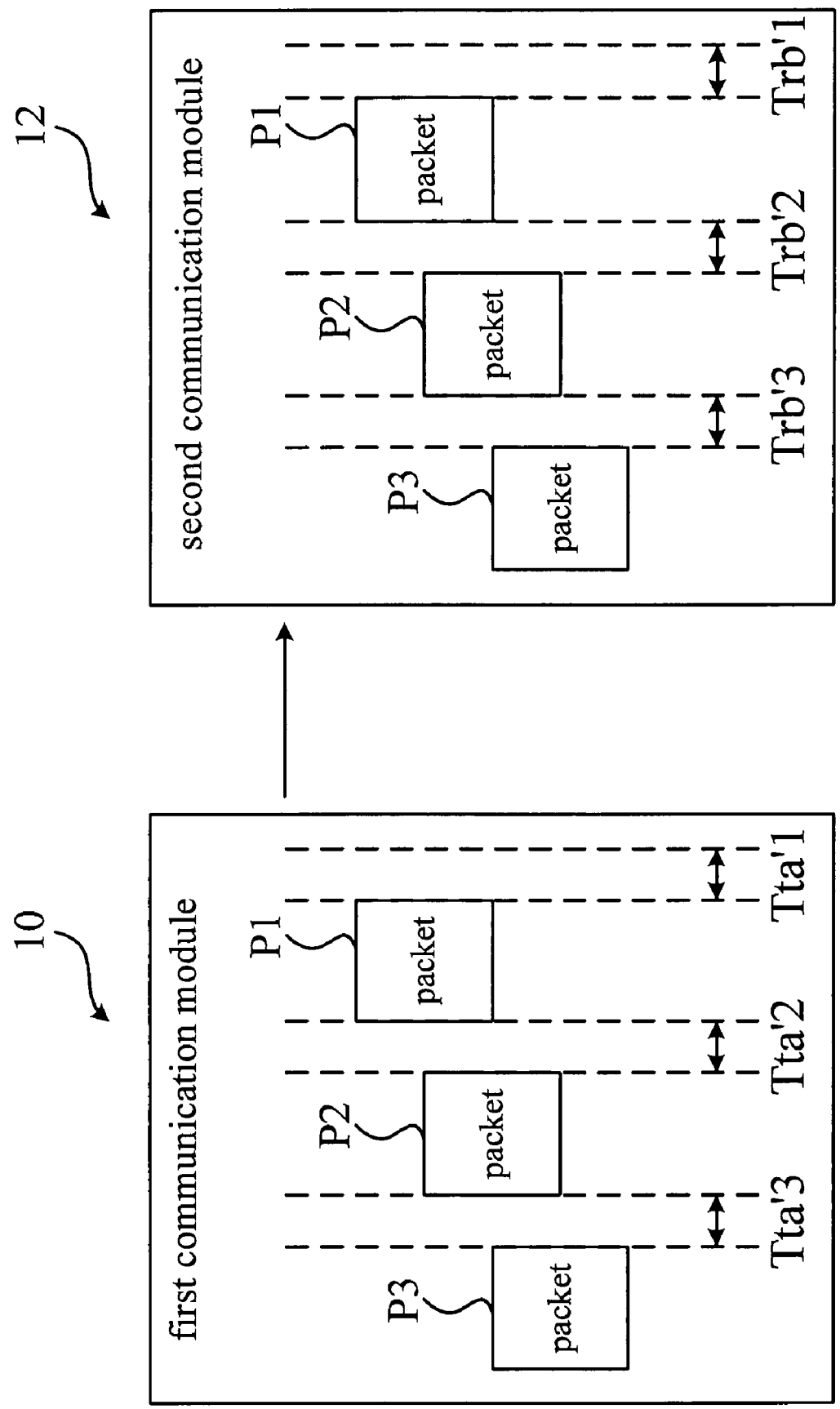
FIG. 3 is a schematic diagram illustrating the packet transmission according to another preferred embodiment of the invention.

Please refer to FIG. 3. FIG. 3 is a schematic diagram illustrating the packet transmission according to another preferred embodiment of the invention. In this embodiment, the time of the first communication module 10 of the wireless communication system 1 is synchronous with the time of the second communication module 12.

The first communication module 10 spends a third processing time transmitting each packet. The third processing time comprises a transmitting time for transmitting each packet. The second communication module 12 spends a fourth processing time receiving each packet. The fourth processing time comprises a receiving time for receiving each packet, and an influence time on the wireless environment and the system load.

As shown in FIG. 3, the first communication module 10 sequentially transmits three packets P1-P3 each with a fifth delay time Tta'1-Tta'3. The second communication module 12 sequentially receives packets P1-P3 each with a sixth delay time Trb'1-Trb'3. According to the third processing time, the fourth processing time, the fifth delay time Tta'1-Tta'3, and the sixth delay time Trb'1-Trb'3 corresponding to the packets P1-P3, the first communication module 10 calculates three reference times and then averages the reference times to obtain a time of flight. It should be noticed that the number of packets can be adjusted according to practical applications.

The reference time is calculated by the following equation 9:

$$\begin{cases} TxA'\_1 + \Delta T'\_1 + TxA(\text{Process})'\_1 + RxB(\text{Process})'\_1 = RxB'\_1 \\ TxA'\_2 + \Delta T'\_2 + TxA(\text{Process})'\_2 + RxB(\text{Process})'\_2 = RxB'\_2 \\ TxA'\_3 + \Delta T'\_3 + TxA(\text{Process})'\_3 + RxB(\text{Process})'\_3 = RxB'\_3. \end{cases}$$ Equation 9

In the equation 9, TxA'_-TXA'_3 respectively represents the first time point when the first communication module 10 transmits the packet P1-P3, RxB'_1-RxB'_3 respectively represents the second time point when the second communication module 12 receives the packet P1-P3, ΔT'_1-ΔT'_3 represents the reference time, TxA(Process)'_1-TxA(Process)'_3 represents the transmitting time corresponding to the packet P1-P3, and RxB(Process)'_1-RxB(Process)'_3 represents the receiving time corresponding to the packet P1-P3.

In this embodiment, the relation of the fifth delay time, the six delay time, and the influence time is listed in the following equation 10:

$$Trb' - Tta' = RxB(\text{Process})' - TxA(\text{Process})' + \Phi xB.'$$ Equation 10:

In the equation 10, Tta' represents the fifth delay time, Trb' represents the sixth delay time, and ΦxB' represents the influence time.

The equation 10 is substituted into the equation 9, and the equation 11 is then obtained as follows:

$$\begin{cases} TxA'\_1 + \Delta T'\_1 + 2TxA(\text{Process})'\_1 + (Trb'\_1 - Tta'\_1) - \Phi xB'\_1 = RxB'\_1 \\ TxA'\_2 + \Delta T'\_2 + 2TxA(\text{Process})'\_2 + (Trb'\_2 - Tta'\_2) - \Phi xB'\_2 = RxB'\_2 \\ TxA'\_3 + \Delta T'\_3 + 2TxA(\text{Process})'\_3 + (Trb'\_3 - Tta'\_3) - \Phi xB'\_3 = RxB'\_3 \end{cases}$$ Equation 11

When the transmitting time TxA(Process)'_1-TxA(Process)'_3 and the influence time ΦxB'_1-ΦxB'_3 are equal to zero, the equation 11 is further transformed into the following equation 12:

$$\begin{cases} TxA'\_1 + \Delta T'\_1 + (Trb'\_1 - Tta'\_1) = RxB'\_1 \\ TxA'\_2 + \Delta T'\_2 + (Trb'\_2 - Tta'\_2) = RxB'\_2 \\ TxA'\_3 + \Delta T'\_3 + (Trb'\_3 - Tta'\_3) = RxB'\_3 \end{cases}$$ Equation 12

Afterward, substitute the first time point TxA'_-TXA'_3 generated while the first communication module 10 transmits the packet P1-P3, the second time point RxB'_1-RxB'_3 generated while the second communication module 12 receives the packet P1-P3, the fifth delay time Tta'_1-Tta'_3, and the sixth delay time Trb'_1-Trb'_3 into the equation 11, such that the reference time ΔT'_1-ΔT'_3 is obtained. Finally, the reference times ΔT'_1-ΔT'_3 are averaged to obtain the time of flight.

Compared to the prior art, the wireless communication system of the invention sequentially receives and transmits multiple packets with multiple delay times. According to the delay times and the processing times, the wireless communication system of the invention calculates multiple reference times and then averages the reference times to obtain the TOF. Alternatively, because the invention takes account of the influence of the hardware structure, the disturbance in the wireless environment, and the load of the hardware system, the calculated time of flight will be more accurate than the prior art. Additionally, no matter whether the time of the first communication module is, synchronous with the time of the second communication module, the invention can be applied to both.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A wireless communication system, comprising:
   a first communication module, after transmitting a first pilot, sequentially transmitting N first packets each with a first delay time, and after receiving a second pilot, sequentially receiving N second packets each with a fourth delay time, each of the N first packets respectively corresponding to one of the N second packets, N being a natural number larger than 1, the first communication module spending a first processing time transmitting and receiving each packet; and
   a second communication module, after receiving the first pilot, sequentially receiving the N first packets each with a second delay time, and after transmitting the second pilot, sequentially transmitting the N second packets each with a third delay time, the second communication module spending a second processing time transmitting and receiving each packet;
   wherein, according to the N first processing times, the N second processing times, the N first delay times, the N second delay times, the N third delay times, and the N fourth delay times corresponding to the N first packets and the N second packets, the first communication module calculates N reference times and averages the N reference times to obtain a time of flight (TOF);
   wherein the first processing time comprises a first transmitting time, a first receiving time, and a first influence time; the first communication module spends the first transmitting time transmitting each packet, spends the first receiving time receiving each packet, and spends the first influence time on a wireless environment and a system load; the first processing time is shown as follows: A(Process)=TxA (Process)+RxA(Process)+Φx A; wherein A(Process) represents the first processing time, TxA(Process) represents the first transmitting time, RxA(Process) represents the first receiving time, and ΦxA represents the first influence time;
   wherein the second processing time comprises a second transmitting time, a second receiving time, and a second influence time; the second communication module spends the second transmitting time transmitting each packet, spends the second receiving time receiving each packet, and spends the second influence time on the wireless environment and the system load; the second processing time is shown as follows:

B(Process)=T×B(Process)+R×B(Process)+Φ×B; wherein B(Process) represents the second processing time, T×B (Process) represents the second transmitting time, R×B (Process) represents the second receiving time, and Φ×B represents the second influence time;

wherein the N reference times are calculated according to the following N first equations:

$$\begin{cases} TxA\_1 + 2\Delta T\_1 + A(Process)\_1 + B(Process)\_1 = RxA\_1 \\ TxA\_2 + 2\Delta T\_2 + A(Process)\_2 + B(Process)\_2 = RxA\_2 \\ \qquad M \\ TxA\_N + 2\Delta T\_N + A(Process)\_N + B(Process)\_N = RxA\_N \end{cases};$$

wherein T×A N represents a first time point when the first communication module transmits the Nth first packet, R×A N represents a second time point when the first communication module receives the Nth second packet, T N represents the Nth reference time, A (Process) N represents the first processing time corresponding to the Nth first packets, and B (Process) N represents the second processing time corresponding to the Nth second packets.

2. The wireless communication system of claim 1, wherein the relation of the first delay time, the second delay time, and the second influence time is listed below: Trb-Tta=R×B(Process)−T×A(Process)+Φ×B; wherein Tta represents the first delay time, and Trb represents the second delay time.

3. The wireless communication system of claim 2, wherein the relation of the third delay time, the fourth delay time, and the first influence time is listed below: Tra-Ttb=R×A(Process)−T×B(Process)+Φ×A; wherein Ttb represents the third delay time, and Tra represents the fourth delay time.

4. The wireless communication system of claim 3, wherein when the first delay time is equal to the third delay time, the equation is obtained as follows: Trb-Tra=B(Process)−A(Process).

5. The wireless communication system of claim 4, wherein the N first equations are transformed into the following N second equations:

$$\begin{cases} TxA\_1 + 2\Delta T\_1 + 2B(Process)\_1 + Tra\_1 − Trb\_1 = RxA\_1 \\ TxA\_2 + 2\Delta T\_2 + 2B(Process)\_2 + Tra\_2 − Trb\_2 = RxA\_2 \\ \qquad M \\ TxA\_N + 2\Delta T\_N + 2B(Process)\_N + Tra\_N − Trb\_N = RxA\_N \end{cases}.$$

wherein Tra_N represents the fourth delay time corresponding to the Nth second packet, and Trb N represents the second delay time corresponding to the Nth first packet.

6. The wireless communication system of claim 5, wherein the second processing time is estimated by a time difference between a time point after the second communication module receives the first packet and a time point before the second communication module transmits the corresponding second packet, such that the N second equations are further transformed into N third equations:

$$\begin{cases} TxA\_1 + 2\Delta T\_1 + 2\beta\_1 + Tra\_1 − Trb\_1 = RxA\_1 \\ TxA\_2 + 2\Delta T\_2 + 2\beta\_2 + Tra\_2 − Trb\_2 = RxA\_2 \\ \qquad M \\ TxA\_N + 2\Delta T\_N + 2\beta\_N + Tra\_N − Trb\_N = RxA\_N \end{cases}$$

7. A wireless communication system, comprising:
a first communication module, sequentially transmitting N packets each with a first delay time, N being a natural number larger than 1, the first communication module spending a first processing time transmitting and receiving each packet; and
a second communication module, sequentially receiving the N packets each with a second delay time, the second communication module spending a second processing time transmitting and receiving each packet;
wherein, according to the N first processing times, the N second processing times, the N first delay times, and the N second delay times corresponding to the N packets, the first communication module calculates N reference times and averages the N reference times to obtain a time of flight (TOF);
wherein the first processing time comprises a first transmitting time, the first communication module spends the first transmitting time transmitting each packet;
wherein the second processing time comprises a receiving time and an influence time, the second communication module spends the receiving time receiving each packet, and spends the influence time on the wireless environment and the system load;
wherein the N reference times are calculated according to the following N first equations:

$$\begin{cases} TxA\_1 + \Delta T\_1 + TxA(Process)\_1 + RxB(Process)\_1 = RxB\_1 \\ TxA\_2 + \Delta T\_2 + TxA(Process)\_2 + RxB(Process)\_2 = RxB\_2 \\ \qquad M \\ TxA\_N + \Delta T\_N + TxA(Process)\_N + RxB(Process)\_N = RxB\_N \end{cases};$$

wherein TxA_N represents a first time point when the first communication module transmits the Nth packet, RxB N represents a second time point when the second communication module receives the Nth packet, T_N represents the Nth reference time, TxA (Process)_N represents the transmitting time corresponding to the Nth packet, and RxB (Process)_N represents the receiving time corresponding to the Nth packet.

8. The wireless communication system of claim 7, wherein the relation of the first delay time, the second delay time, and the influence time is listed below: Trb-Tta=R×B (Process)−T×A (Process) +Φ×B; wherein Tta represents the first delay time, and Trb represents the second delay time, T×A (Process) represents the transmitting time, R×B(Process) represents the receiving time, and Φ×B represents the influence time.

9. The wireless communication system of claim 8, wherein the N first equations are transformed into the following N second equations:

$$\begin{cases} TxA\_1 + \Delta T\_1 + 2TxA(Process)\_1 + (Trb\_1 - Tta\_1) - \Phi xB\_1 = RxB\_1 \\ TxA\_2 + \Delta T\_2 + 2TxA(Process)\_2 + (Trb\_2 - Tta\_2) - \Phi xB\_2 = RxB\_2 \\ \quad M \\ TxA\_N + \Delta T\_N + 2TxA(Process)\_N + (Trb\_N - Tta\_N) - \Phi xB\_N = RxB\_N \end{cases}.$$

wherein Tta N represents the first delay time corresponding to the Nth packet, Trb_N represents the second delay time corresponding to the Nth packet, and ΦxB _N represents the influence time corresponding to the Nth packet.

10. The wireless communication system of claim 9, wherein when the transmitting time and the influence time are equal to zero, the N second equations is further transformed to the following N third equations:

$$\begin{cases} TxA\_1 + \Delta T\_1 + (Trb\_1 - Tta\_1) = RxB\_1 \\ TxA\_2 + \Delta T\_2 + (Trb\_2 - Tta\_2) = RxB\_2 \\ \quad M \\ TxA\_N + \Delta T\_N + (Trb\_N - Tta\_N) = RxB\_N \end{cases}.$$

* * * * *